United States Patent [19]

McDermott et al.

[11] 4,267,526
[45] May 12, 1981

[54] CONTINUOUS WAVE CHEMICALLY PUMPED ATOMIC IODINE LASER

[75] Inventors: William E. McDermott; David J. Benard; Nicholas R. Pchelkin; Ronald R. Bousek, all of Albuquerque, N. Mex.

[73] Assignee: The United States of America as represented by the Secretary of the Air Force, Washington, D.C.

[21] Appl. No.: 29,947

[22] Filed: Apr. 13, 1979

[51] Int. Cl.³ .......................................... H01S 3/095
[52] U.S. Cl. ............................................. 331/94.5 G
[58] Field of Search ...................................... 331/94.56

[56] References Cited

PUBLICATIONS

"Gas Discharge Laser Operating on The Iodine 1315-nm transition" by Zalesskii; Sov. Phys. JEIP, vol. 40, No. 1, (1975).
"Chemical Pumping of Water Vapor Laser I"; by Downey et al; Journ. Chem. Phys. vol. 64, No. 7, Apr. 1976.
"Laser Emission of 1.32 μm from Atomic Iodine Produced by Electrical Dissociation of $CF_3I$"; by Pleasance et al; Appl. Phys. Lett., vol. 27, No. 7, (1975).

Primary Examiner—William L. Sikes
Assistant Examiner—León Scott
Attorney, Agent, or Firm—Donald J. Singer; William J. O'Brien

[57] ABSTRACT

CW laser action achieved on the $^2P_1 78-^2P_3/2$ transition of the iodine atom by energy transfer from the $^1\Delta$ metastable state of $O_2$. The effluent from a conventional oxygen generator was mixed with molecular iodine at the entrance of a longitudinal flow laser cavity where the $I_2$ was dissociated by a small amount of $O_2$ ($^1\Sigma$) that was present in the flow due to energy pooling processes. The measured output power was greater than 4mW.

2 Claims, 1 Drawing Figure

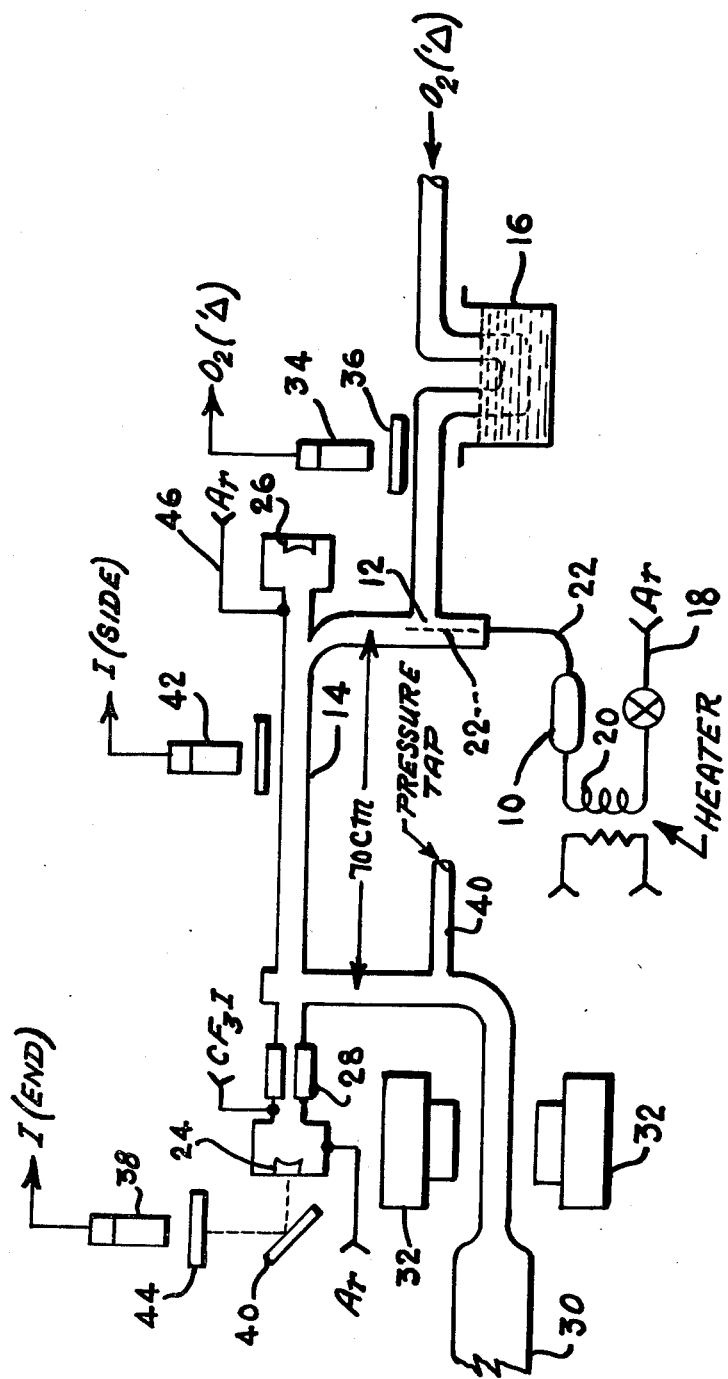

CONTINUOUS WAVE CHEMICALLY PUMPED ATOMIC IODINE LASER

STATEMENT OF GOVERNMENT INTEREST

The invention described herein may be manufactured and used by or for the Government for governmental purposes without the payment of any royalty thereon.

BACKGROUND OF THE INVENTION

This invention relates to a continuous wave, chemical laser. More particularly, this invention relates to a chemically pumped, atomic iodine laser in which the lasing action occurs by reason of an energy transfer reaction between iodine and the $^1\Delta$ metastable state of oxygen.

The recent development of systems capable of generating and amplifying coherent electromagnetic energy in the optical frequency range has created a considerable amount of interest in utilizing such systems for a variety of military, navigation, communication and heating applications. In order to produce the desired energy, or lasing action, the systems employ an optically active component from which the coherent electromagnetic energy is extracted by means of a phenomenon called population inversion. The optically active component possesses an unstable energy state capable of releasing photons as they decay to lower energy states.

The optically active compound may be a solid, liquid or gas. The gas laser, the subject matter of which concerns this invention, is generally categorized as being chemical, electric discharge, optically pumped, or gas dynamic depending on the manner by which the optically active component achieves the requisite population inversion. Chemical lasers achieve population inversion by direct generation or pumping of higher energy states through the mechanism of a chemical reaction. A critical portion of our device is that it populates electronically excited states rather than vibrationally excited states. It is the first chemically pumped laser to do so. As such it is the shortest wavelength device yet devised. Electric discharge lasers achieve their population inversion by pumping the higher energy state by means of an electric current while gas dynamic lasers achieve population inversion by reducing the population level of a lower energy vibrational state of a hot gas in thermal equilibrium by reason of a rapid cooling caused by a supersonic aerodynamic expansion.

In general, the technique for generating a laser action by means of a chemical reaction is achieved by the resonant transfer of energy through a reaction between an energizing reactant, such as vibrationally excited nitrogen, and a lasing reactant such as carbon dioxide. Other gaseous products, such as nitrous oxide, carbon dioxide, helium, hydrogen, fluorine and mixtures thereof are known for their lasing action. For example, the diffusion of hydrogen into a supersonic jet flow containing fluorine reacts chemically to provide a sustained flow of a vibrationally excited gaseous product having the necessary population inversion and lifetime required for lasing. The vibrationally excited gas flows into an optical laser cavity where the lasing action is actually generated.

The chemical lasers presently available in the art operate on rotational-vibrational transitions within a single electronic state. With this invention, however, it has been found that a lasing action can be achieved by chemically pumped electronic transitions. This represents a new class of lasers. The operation is continuous and laser excitation is obtained entirely from chemical energy. Energy transfer takes place from electronically excited molecular oxygen to atomic iodine. This is the first atomic iodine laser operating at 1315 nanometers wavelength with continuous power. The system of this invention provides continuous lasing at shorter wavelengths than produced by presently known chemical lasers.

Accordingly, the primary object of this invention is to provide a system for the production of a continuous wave lasing action.

Another object of this invention is to provide a lasing system in which the requisite population inversion is accomplished through the medium of a chemical reaction with no external power source required.

Still another object of this invention is to provide a lasing system that operates at short wavelengths.

A further object of this invention is to provide a chemically pumped electronic transition laser.

Still a further object of this invention is to provide an atomic iodine laser that operates at 1315 nanometers wavelength with continuous power.

The above and still further objects and advantages of the present invention will become more readily apparent upon consideration of the following detailed disclosure thereof when viewed in conjunction with the accompanying drawing.

DESCRIPTION OF THE DRAWING

In the drawing:

The FIGURE represents a simplified schematic view illustrating an optical resonator suitable for use with the lasing system of this invention.

DESCRIPTION OF THE PREFERRED EMBODIMENT

Pursuant to the above defined objects, the present invention concerns itself with a continuous wave, electronic transition chemical laser. The lasing action is achieved by a transition between two distinct electronic states which is pumped only by a chemical reaction between iodine and electronically excited molecular oxygen. No external power source is necessary.

The laser of this invention operates on the $^2P_{\frac{1}{2}} - ^2P_{3/2}$ transition of the iodine atom at 1315 nm and is pumped in accordance with the following four step reaction scheme.

$$O_2(^1\Delta) + O_2(^1\Delta) \rightarrow O_2(^1\Sigma)O_2(^3\Sigma) \tag{1}$$

$$O_2(^1\Sigma) + I_2 \rightarrow O_2(^3\Sigma) + 2I(^2P3/2) \tag{2}$$

$$O_2(^1\Delta) + I(^2P3/2) \rightleftharpoons O_2(^3\Sigma) + I^*(^2P_{\frac{1}{2}}) \tag{3}$$

$$I^*(^2P_{\frac{1}{2}}) + O_2(^1\Delta) \rightarrow O_2(^1\Sigma) + I(^2P3/2) \tag{4}$$

The fourth step in this scheme is critical in that it guarantees total dissociation of the $I_2$ by a "positive feedback" type of kinetics. This effect is relevant since $I_2$ is an efficient quencher of $I^*(^2P_{\frac{1}{2}})$.

Any suitable electronically excited oxygen may be used as the energizing component for this invention. For example, the $O_2(^1\Delta)$ product prepared by the method disclosed in U.S. patent application, entitled "Gas Generating System For Chemical Lasers", filed of even date herewith, has proven to be suitable. Briefly, the $O_2(^1\Delta)$ product of that method is prepared by reacting flowing chlorine gas with a basic solution of hydrogen peroxide within the reaction zone of a conventional chemical generator. After exiting from the generator, the $O_2(^1\Delta)$ product is directed to a conventional laser such as that illustrated in the drawing.

Molecular iodine from container 10 is injected at 12 into a flow of excited molecular oxygen at a point just ahead of its entrance into a laser cavity 14. As the $O_2(^1\Delta)$ enters into the lasing device, it passes through a $-160°$ C. cold trap 16. Argon gas 18 passes through a heater 20 to heat the gas to a temperature of about 90° C. The heated argon 18 then passes through the stainless steel bomb 10 filled with molecular iodine where the $I_2$ is entrained by the argon gas 18 which then flows into the laser cavity 14 through a moveable stainless steel injector tube 22. The tube 22 is capped and has four small holes drilled around its periphery. When $I_2$ is injected into the oxygen stream at 12, a bright yellow flame due to $I_2(B-X)$ radiation is observed. The $I_2$ flame dies off within a few cm of the point of injection 12. The active portion of the $O_2$-$I^*$ flow is contained inside a 70 cm long 1" ID pyrex tube coated with a halocarbon wax, where the linear flow velocity is approximately 1500 cm/sec.

The laser cavity 14 is 1.7 m long with internal maximum reflectance dielectric mirrors 24 and 26 of 5 m and 2 m radius of curvature respectively. A small (10 cm long) flashlamp 28 is integral to the cavity 14 to allow optical alignment by photodissociation of $CF_3I$. The cavity threshold was found to occur near 20 millitorr $CF_3I$ with a flash energy of 60 joules, corresponding to a single pass threshold gain of 0.2%. The mirror transmission was measured to be less than $10^{-2}\%$. Optical alignment is difficult to achieve before operating, but the addition of $CF_3I$ to the flashlamp 28, as shown, facilitates alignment of the mirrors.

The exhaust from the laser cavity 14 exits through vacuum means 30 and is analyzed by a Varian Model E-112 electronic paramagnetic resonance spectrophotometer 32 that was used to calibrate the optical diagnostics for the $O_2(^1\Delta)$ and to measure the purity of the chemically generated oxygen by detecting both the $O_2(^1\Delta)$ and $O_2(^3\Sigma)$ resonances. The chemical generator performance for producing the $O_2(^1\Delta)$ was monitored at the exit of the cold trap 16 with a liquid nitrogen cooled intrinsic Ge detector 34 at 1270 nm using a 10 nm band pass interference filter 36.

The $I(^2P_{\frac{1}{2}}-^2P{3/2})$ emission in the laser cavity was similarly monitored by a second cooled intrinsic Ge detector 38 looking down the laser axis through angled mirror 40 and an InAs detector 42 (liquid nitrogen cooled with phase sensitive detection) viewing the side emission approximately 10 cm down from the inlet to cavity 14. The sensitivity of the two $I^*$ detectors 38 and 42 were limited to 1315 nm by 10 nm band pass interference filters 36 and 44. The output from the on-axis detector was displayed vertically by an X-Y recorder and the side-looking detector horizontally by an X-Y recorder not shown.

Argon gas 46 was injected into cavity 14 to keep the flowing mixture of $O_2(^1\Delta)$ and $I_2$ off mirrors 26 and 24 since $I_2$ has a tendency to damage it. A pressure tap 48 measures the pressure in the laser cavity 14.

Below laser threshold, the on-axis detector 38 tracked linearly with the side looking detector 42 as the $I_2$ flow was increased. Near threshold, the curve began to show an upward curvature approaching the vertical as the system approached threshold.

In a typical laser experiment, a flow of about 1 torr of total oxygen was used, the mirrors were purged with 0.6 torr of Argon gas 46 and a similar flow of Argon gas 18 was passed through the $I_2$ injection tube 22. The iodine flow was then adjusted until the plot of longitudinal versus side fluorescence began to show an upward curvature. At this point, the laser mirrors 24 and 22 were tuned slightly to maximize the end fluorescence. Typically, laser action was evidenced by either a greater than 200-fold increase in the end fluorescence with no change in the side fluorescence or by saturation of the intrinsic Ge detector 38. The mode pattern of the laser could be readily observed on a Kodak IR phosphor card, not shown, placed approximately three meters from the output mirror 26. Mode switching occurred when the mirrors were slightly adjusted. Run times of several minutes were obtained and lasing could be terminated by (1) adjusting the cavity off resonance, (2) turning off the $I_2$ flow, or (3) turning off the $O_2(^1\Delta)$ flow or, if desired, by turning off the chlorine flow in the oxygen generator.

Measured laser outputs in excess of 4 milliwatts were recorded using a Scientech Inc. Model 3620 power meter. Since the laser mirrors were not chosen for optimal outcoupling, the major portion of the stimulated emission power indeed was lost to absorption in the dielectric coatings rather than to transmission as laser output. The circulation power within the laser cavity, however, approached 100 watts. The estimated closed cavity power in our longitudinal flow laser 14, based on the rate of $O_2(^1\Delta)$, generation, was approximately 1 watt assuming efficient utilization of the mode volume and infinite saturation. These conditions were not obtained in the current device, thus it was not surprising that the output power was substantially lower, however, with a 10X scale up to the molar flow rate from the oxygen generator, it does appear possible to construct a 10 watt transverse flow laser at 1 torr system pressures in which the conditions for efficient outcoupling can be satisfied.

While the invention has been described with reference to a particular embodiment, various alterations and modifications will become apparent to those skilled in the art, and that all such modifications as appear in the appended claims are intended to be included herein.

What is claimed is:

1. A method for producing a continuous wave, chemically pumped lasing action which comprises:
   A. providing a resonant cavity having oppositely disposed reflecting means;
   B. continuously introducing a stream of gaseous molecular oxygen in the singlet-delta electronic state into said cavity;
   C. admixing a continuous flow of gaseous molecular iodine with said stream of oxygen to form an electronically excited, continuously flowing, gaseous mixture;
   D. passing said flowing, excited gaseous mixture through said resonant cavity to produce a beam of coherent electromagnetic radiation; and
   E. continuously exhausting said oxygen and iodine gasses at the end of said resonant cavity subsequent to their mixing.

2. A method in accordance with claim 1 wherein said molecular iodine is admixed at a point just ahead of the entry of said gaseous oxygen into said resonant cavity.

* * * * *